US010313544B2

(12) United States Patent
Horishita

(10) Patent No.: US 10,313,544 B2
(45) Date of Patent: Jun. 4, 2019

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Yusuke Horishita, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/204,703

(22) Filed: Jul. 7, 2016

(65) Prior Publication Data

US 2017/0013156 A1 Jan. 12, 2017

(30) Foreign Application Priority Data

Jul. 10, 2015 (JP) ................................ 2015-138898

(51) Int. Cl.
*H04N 1/00* (2006.01)

(52) U.S. Cl.
CPC ..... *H04N 1/00891* (2013.01); *H04N 1/00015* (2013.01); *H04N 1/00034* (2013.01); *H04N 1/00058* (2013.01); *H04N 1/00068* (2013.01); *H04N 2201/0094* (2013.01)

(58) Field of Classification Search
USPC ........................................................ 358/1.14
See application file for complete search history.

(56) References Cited

U.S. PATENT DOCUMENTS

2002/0054330 A1* 5/2002 Jinbo .................... G06F 3/1221 358/1.15
2012/0146903 A1* 6/2012 Arihara .................. G06F 3/011 345/158
2013/0010335 A1* 1/2013 Baba ................. G03G 15/5004 358/3.01
2017/0013156 A1* 1/2017 Horishita ........... H04N 1/00891

FOREIGN PATENT DOCUMENTS

JP 2013-20048 A 1/2013
JP 2015123664 A 7/2015

* cited by examiner

*Primary Examiner* — Neil R Mclean
*Assistant Examiner* — Darryl V Dottin
(74) *Attorney, Agent, or Firm* — Canon U.S.A., Inc. IP Division

(57) ABSTRACT

An image forming apparatus provided with a sensor including a plurality of elements that detect temperature in the vicinity of the image forming apparatus includes an acquisition unit that obtains temperature data indicating the temperature detected by each of the plurality of elements, a calculation unit that calculates a feature point of a heat source region in the vicinity of the image forming apparatus based on obtained plurality of pieces of temperature data, and a recover unit that causes the image forming apparatus to recover from a power saving state based on a position of the calculated feature point.

26 Claims, 9 Drawing Sheets

10
20
21
11
30
22

EXTERNAL APPARATUS
60
50
10
200
207
212
LAN CONTROLLER
206
IMAGE PROCESSING UNIT
209
PRINTER I/F
211
PRINTER CONTROL UNIT
401
PRINTER DRIVING UNIT
402
400
600
SENSOR
601
MICROCOMPUTER
602
RAM
202
CPU
201
HDD
208
ROM
203
SCANNER I/F
210
SCANNER CONTROL UNIT
301
SCANNER DRIVING UNIT
302
300
OPERATION UNIT
500
INPUT/ OUTPUT I/F
205
POWER SUPPLY CONTROL UNIT
204
POWER SUPPLY UNIT
100

10
EXTERNAL APPARATUS
60
50
200
600
601
SENSOR
602
MICROCOMPUTER
500
OPERATION UNIT
205
INPUT/ OUTPUT I/F
201
CPU
202
RAM
206
LAN CONTROLLER
207
212
203
ROM
208
HDD
209
IMAGE PROCESSING UNIT
210
SCANNER I/F
211
PRINTER I/F
204
POWER SUPPLY CONTROL UNIT
100
POWER SUPPLY UNIT
300
302
SCANNER DRIVING UNIT
301
SCANNER CONTROL UNIT
400
402
PRINTER DRIVING UNIT
401
PRINTER CONTROL UNIT

FIG.5A

LOW TEMPERATURE ENVIRONMENT

CURRENT TEMPERATURE DISTRIBUTION

| y \ x | 1 | 2 | 3 | 4 | 5 | 6 | 7 | 8 |
|---|---|---|---|---|---|---|---|---|
| 8 | 10 | 10 | 11 | 10 | 10 | 12 | 12 | 10 |
| 7 | 10 | 11 | 11 | 12 | 12 | 10 | 12 | 10 |
| 6 | 10 | 10 | 13 | 25 | 26 | 13 | 12 | 10 |
| 5 | 10 | 14 | 21 | 25 | 25 | 21 | 14 | 10 |
| 4 | 10 | 13 | 23 | 24 | 24 | 22 | 12 | 10 |
| 3 | 11 | 20 | 20 | 19 | 19 | 20 | 21 | 10 |
| 2 | 12 | 17 | 18 | 18 | 18 | 18 | 17 | 13 |
| 1 | 12 | 16 | 16 | 17 | 15 | 16 | 16 | 13 |

y DIRECTION / x DIRECTION

PAST TEMPERATURE DISTRIBUTION

| y \ x | 1 | 2 | 3 | 4 | 5 | 6 | 7 | 8 |
|---|---|---|---|---|---|---|---|---|
| 8 | 10 | 10 | 11 | 10 | 10 | 12 | 12 | 10 |
| 7 | 10 | 11 | 11 | 10 | 10 | 10 | 12 | 10 |
| 6 | 10 | 10 | 11 | 10 | 10 | 10 | 12 | 10 |
| 5 | 10 | 11 | 9 | 10 | 9 | 10 | 11 | 10 |
| 4 | 10 | 10 | 11 | 10 | 10 | 12 | 10 | 10 |
| 3 | 10 | 9 | 10 | 10 | 10 | 10 | 12 | 10 |
| 2 | 10 | 10 | 11 | 10 | 10 | 10 | 12 | 10 |
| 1 | 10 | 11 | 9 | 10 | 9 | 10 | 11 | 10 |

y DIRECTION / x DIRECTION

DETECTION RESULT OF HEAT SOURCE PIXELS y DIRECTION 8 7 6 5 4 3 2 1; x DIRECTION 1 2 3 4 5 6 7 8; A

■ (CURRENT TEMPERATURE) − (PAST TEMPERATURE) ≥ 1°C

□ (CURRENT TEMPERATURE) − (PAST TEMPERATURE) < 1°C

FIG.5B

ROOM TEMPERATURE ENVIRONMENT

CURRENT TEMPERATURE DISTRIBUTION

| y \ x | 1 | 2 | 3 | 4 | 5 | 6 | 7 | 8 |
|---|---|---|---|---|---|---|---|---|
| 8 | 22 | 22 | 20 | 23 | 22 | 20 | 22 | 20 |
| 7 | 20 | 22 | 20 | 26 | 25 | 21 | 22 | 22 |
| 6 | 22 | 22 | 23 | 31 | 32 | 22 | 22 | 20 |
| 5 | 20 | 22 | 29 | 32 | 31 | 28 | 22 | 22 |
| 4 | 22 | 22 | 28 | 29 | 27 | 28 | 22 | 22 |
| 3 | 20 | 26 | 24 | 26 | 25 | 26 | 26 | 20 |
| 2 | 22 | 26 | 25 | 25 | 25 | 26 | 24 | 20 |
| 1 | 20 | 26 | 26 | 26 | 25 | 25 | 24 | 22 |

PAST TEMPERATURE DISTRIBUTION

| y \ x | 1 | 2 | 3 | 4 | 5 | 6 | 7 | 8 |
|---|---|---|---|---|---|---|---|---|
| 8 | 22 | 22 | 20 | 23 | 22 | 20 | 22 | 20 |
| 7 | 20 | 22 | 20 | 23 | 22 | 21 | 22 | 22 |
| 6 | 22 | 22 | 22 | 21 | 22 | 21 | 22 | 20 |
| 5 | 20 | 22 | 21 | 20 | 22 | 20 | 22 | 22 |
| 4 | 22 | 22 | 22 | 21 | 22 | 20 | 22 | 22 |
| 3 | 20 | 22 | 21 | 20 | 21 | 21 | 20 | 20 |
| 2 | 22 | 22 | 22 | 21 | 22 | 21 | 22 | 20 |
| 1 | 20 | 22 | 20 | 21 | 22 | 20 | 22 | 22 |

DETECTION RESULT OF HEAT SOURCE PIXELS 8 7 6 5 4 3 2 1; 1 2 3 4 5 6 7 8; B

■ (CURRENT TEMPERATURE) − (PAST TEMPERATURE) ≥ 1°C

□ (CURRENT TEMPERATURE) − (PAST TEMPERATURE) < 1°C

FIG.5C

HIGH TEMPERATURE ENVIRONMENT

CURRENT TEMPERATURE DISTRIBUTION

| y \ x | 1 | 2 | 3 | 4 | 5 | 6 | 7 | 8 |
|---|---|---|---|---|---|---|---|---|
| 8 | 30 | 31 | 32 | 32 | 31 | 30 | 30 | 30 |
| 7 | 31 | 31 | 32 | 33 | 34 | 30 | 30 | 30 |
| 6 | 30 | 31 | 30 | 31 | 33 | 30 | 29 | 30 |
| 5 | 31 | 31 | 31 | 31 | 31 | 32 | 30 | 30 |
| 4 | 30 | 31 | 32 | 31 | 31 | 30 | 30 | 30 |
| 3 | 32 | 31 | 30 | 31 | 30 | 31 | 30 | 31 |
| 2 | 30 | 31 | 31 | 30 | 29 | 30 | 29 | 30 |
| 1 | 31 | 31 | 30 | 31 | 31 | 30 | 30 | 30 |

PAST TEMPERATURE DISTRIBUTION

| y \ x | 1 | 2 | 3 | 4 | 5 | 6 | 7 | 8 |
|---|---|---|---|---|---|---|---|---|
| 8 | 30 | 31 | 32 | 32 | 31 | 30 | 30 | 30 |
| 7 | 31 | 31 | 32 | 31 | 31 | 30 | 30 | 30 |
| 6 | 30 | 31 | 30 | 30 | 30 | 30 | 29 | 30 |
| 5 | 31 | 31 | 32 | 31 | 31 | 30 | 30 | 30 |
| 4 | 30 | 31 | 32 | 32 | 30 | 30 | 30 | 30 |
| 3 | 32 | 31 | 30 | 31 | 30 | 30 | 30 | 31 |
| 2 | 30 | 31 | 30 | 30 | 30 | 29 | 29 | 30 |
| 1 | 31 | 31 | 30 | 31 | 31 | 30 | 30 | 30 |

DETECTION RESULT OF HEAT SOURCE PIXELS 8 7 6 5 4 3 2 1; 1 2 3 4 5 6 7 8; C

■ (CURRENT TEMPERATURE) − (PAST TEMPERATURE) ≥ 1°C

□ (CURRENT TEMPERATURE) − (PAST TEMPERATURE) < 1°C

FIG.6

| FEATURE AMOUNT | ANALYSIS RESULT IN LOW TEMPERATURE ENVIRONMENT | ANALYSIS RESULT IN ROOM TEMPERATURE ENVIRONMENT | | ANALYSIS RESULT IN HIGH TEMPERATURE ENVIRONMENT | |
|---|---|---|---|---|---|
| | | | DIFFERENCE FROM EXPECTED VALUE | | DIFFERENCE FROM EXPECTED VALUE |
| AREA | 40 PIXELS | 30 PIXELS | 10 PIXELS | 4 PIXELS | 36 PIXELS |
| HEIGHT | 7 | 7 | 0 | 3 | 4 |
| WIDTH | 8 | 6 | 2 | 3 | 5 |
| GRAVITY CENTER COORDINATE IN y-AXIS DIRECTION | 3.35 | 3.27 | 0.08 | 6.25 | 2.9 |
| GRAVITY CENTER COORDINATE IN x-AXIS DIRECTION | 4.5 | 4.5 | 0 | 5 | 0.5 |
| MAX COORDINATE IN y-AXIS DIRECTION | 7 | 7 | 0 | 7 | 0 |
| MAX COORDINATE IN x-AXIS DIRECTION | 8 | 7 | 1 | 6 | 2 |
| MIN COORDINATE IN y-AXIS DIRECTION | 1 | 1 | 0 | 5 | 4 |
| MIN COORDINATE IN x-AXIS DIRECTION | 1 | 2 | 1 | 4 | 3 |
| CENTER COORDINATE IN y-AXIS DIRECTION | 4 | 4 | 0 | 6 | 2 |
| CENTER COORDINATE IN x-AXIS DIRECTION | 4.5 | 4.5 | 0 | 5 | 0.5 |

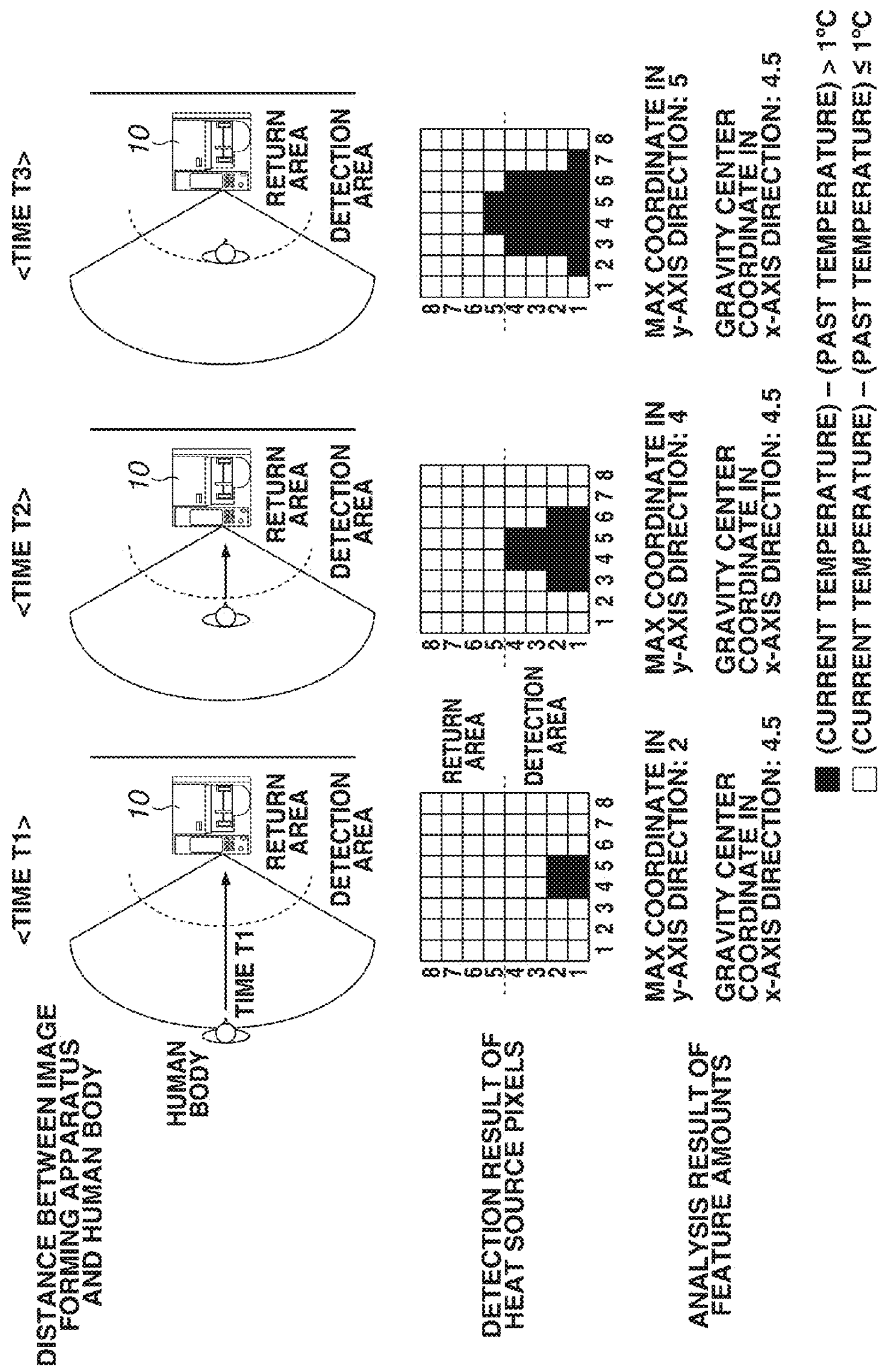
FIG.8
<TIME T1>
<TIME T2>
<TIME T3>
DISTANCE BETWEEN IMAGE FORMING APPARATUS AND HUMAN BODY
HUMAN BODY
TIME T1
10
RETURN AREA
DETECTION AREA
DETECTION RESULT OF HEAT SOURCE PIXELS
ANALYSIS RESULT OF FEATURE AMOUNTS
MAX COORDINATE IN y-AXIS DIRECTION: 2
GRAVITY CENTER COORDINATE IN x-AXIS DIRECTION: 4.5
MAX COORDINATE IN y-AXIS DIRECTION: 4
GRAVITY CENTER COORDINATE IN x-AXIS DIRECTION: 4.5
MAX COORDINATE IN y-AXIS DIRECTION: 5
GRAVITY CENTER COORDINATE IN x-AXIS DIRECTION: 4.5
(CURRENT TEMPERATURE) − (PAST TEMPERATURE) > 1°C
(CURRENT TEMPERATURE) − (PAST TEMPERATURE) ≤ 1°C

IMAGE FORMING APPARATUS AND METHOD FOR CONTROLLING IMAGE FORMING APPARATUS

BACKGROUND

Field

Aspects of the present invention generally relate to an image forming apparatus including a sensor and a method for controlling the image forming apparatus.

Description of the Related Art

Ecological awareness has been increasing in recent years. Under such circumstances, image forming apparatuses, such copying machines, are configured to reduce power consumption during standby by entering a power saving state where power supply to a printer unit and a scanner unit is stopped if the image forming apparatus is left unused for a predetermined time.

If a user uses an image forming apparatus currently in a power saving state, the user typically needs to press a button on the image forming apparatus for the image forming apparatus to recover from the power saving state. The user then usually needs to wait near the image forming apparatus until the image forming apparatus is ready to use. In view of this, image forming apparatuses have recently started to automatically recover from the power saving state if a nearby user is detected by a sensor for detecting user's (hereinafter, referred to as a human body detection sensor).

However, in many instances, image forming apparatuses are often installed in shared spaces. In addition to users of the image forming apparatus, there may also be passersby who simply pass by in the vicinity of the image forming apparatus. In this environment, the human detection sensor can sometimes detect a passerby and cause the image forming apparatus to erroneously recover from a power saving state. An image forming apparatus has therefore been desired that determines whether a person approaching the image forming apparatus is a user or a passerby.

Japanese Patent Application Laid-Open No. 2013-20048 discusses an image forming apparatus including an infrared array sensor including a plurality of elements for detecting heat around the image forming apparatus. According to Japanese Patent Application Laid-Open No. 2013-20048, the image forming apparatus recovers from the power saving state if a temperature distribution pattern obtained by the infrared array sensor is similar to a pre-stored pattern.

According to Japanese Patent Application Laid-Open No. 2013-20048, the recovery of the image forming apparatus from the power saving state is controlled, for example, by comparing a pattern representing a state where a user holds a document in the user's hand with the temperature distribution pattern obtained by the infrared array sensor. However, since the document held in the user's hand changes similarly to the surrounding environment in temperature, the presence or absence of the document is difficult to determine from the temperature distribution pattern obtained by the infrared array sensor. As a result, an erroneous detection can occur that results in recovery by the image forming apparatus from the power saving state even if the user is not holding a document.

The temperature of the surrounding environment does not just affect the document as described above. The surface temperature of a person is also affected by the temperature of the surrounding environment. For example, it is known that the surface temperature of a human hand is greatly affected by the temperature of the surrounding environment. It is therefore also difficult to identify a human hand from the temperature distribution pattern obtained by the infrared array sensor. It is known that the surface temperature of a human's abdominal region is less susceptible to the surrounding environment temperature, whereas the accurate surface temperature of the abdominal region is difficult to obtain by the infrared array sensor because of, for example, a person's clothing.

An image forming apparatus placed in various temperature environments needs to stably detect a person without being affected by the temperature of the surrounding environment.

SUMMARY OF THE INVENTION

The inventor of the present disclosure has taken note that the surface temperature of a human face is less susceptible to the temperature of the surrounding environment while free of the influence of clothing. The inventor of the present invention has also noticed that the position of a human face is a stable parameter when determining the distance between the image forming apparatus and the human body. Accordingly, aspects of the present invention are generally directed to an image forming apparatus that stably determines the position of a human in various temperature environments by using the position of a point considered to be a position of a human face.

According to an aspect of the present invention, an image forming apparatus including a sensor including a plurality of elements configured to detect temperature in a vicinity of the image forming apparatus includes an acquisition unit configured to obtain temperature data indicating the temperature detected by each of the plurality of elements, a calculation unit configured to calculate a feature point of a heat source region in the vicinity of the image forming apparatus based on a plurality of pieces of temperature data obtained by the acquisition unit, and a recover unit configured to cause the image forming apparatus to recover from a power saving state based on a position of the calculated feature point.

Further features of aspects of the present invention will become apparent from the following description of exemplary embodiments with reference to the attached drawings.

BRIEF DESCRIPTION OF THE DRAWINGS

FIG. 5A is a diagram illustrating temperature distribution data, background temperature data, and a distribution of heat source pixels in a low temperature environment. FIG. 5B is a diagram illustrating the temperature distribution data, the background temperature data, and the distribution of heat source pixels in a room temperature environment. FIG. 5C is a diagram illustrating the temperature distribution data, the background temperature data, and the distribution of heat source pixels in a high temperature environment.

FIG. 6 is a chart illustrating analysis results of a microcomputer.

FIG. 8 is a diagram illustrating a case where a user directly approaches the image forming apparatus from the front.

DESCRIPTION OF THE EMBODIMENTS

A mode for carrying out aspects of the present invention will be described below with reference to the drawings.

Figure 1:
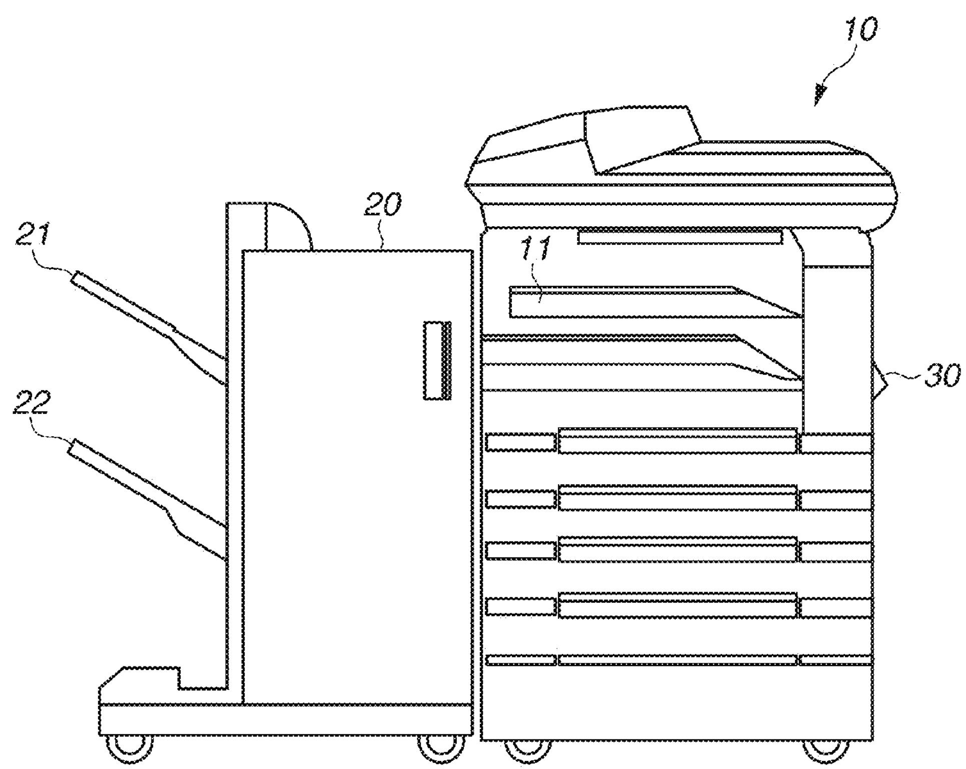
FIG. 1 is an external view of an image forming apparatus.

FIG. 1 is an external view of an image forming apparatus 10.

The image forming apparatus 10 is a multifunction peripheral (MFP) including various functions, such as a copy function, a scanner function, a facsimile (FAX) function, a print function, etc. A finisher 20 discharges printed sheets to a tray 21 or a tray 22 after execution of copying or printing. The image forming apparatus 10 can also discharge sheets to an internal sheet discharge unit 11 arranged inside. The finisher 20 is optional equipment for the image forming apparatus 10. If the finisher 20 is not attached to the image forming apparatus 10, printed sheets are output to the internal sheet discharge unit 11. The image forming apparatus 10 can sort and discharge sheets to the trays 21 and 22 of the finisher 20 and the internal sheet discharge unit 11 of the image forming apparatus 10 according to the copy and FAX functions. A power switch 30 is arranged on a side of the image forming apparatus 10.

Figure 2:
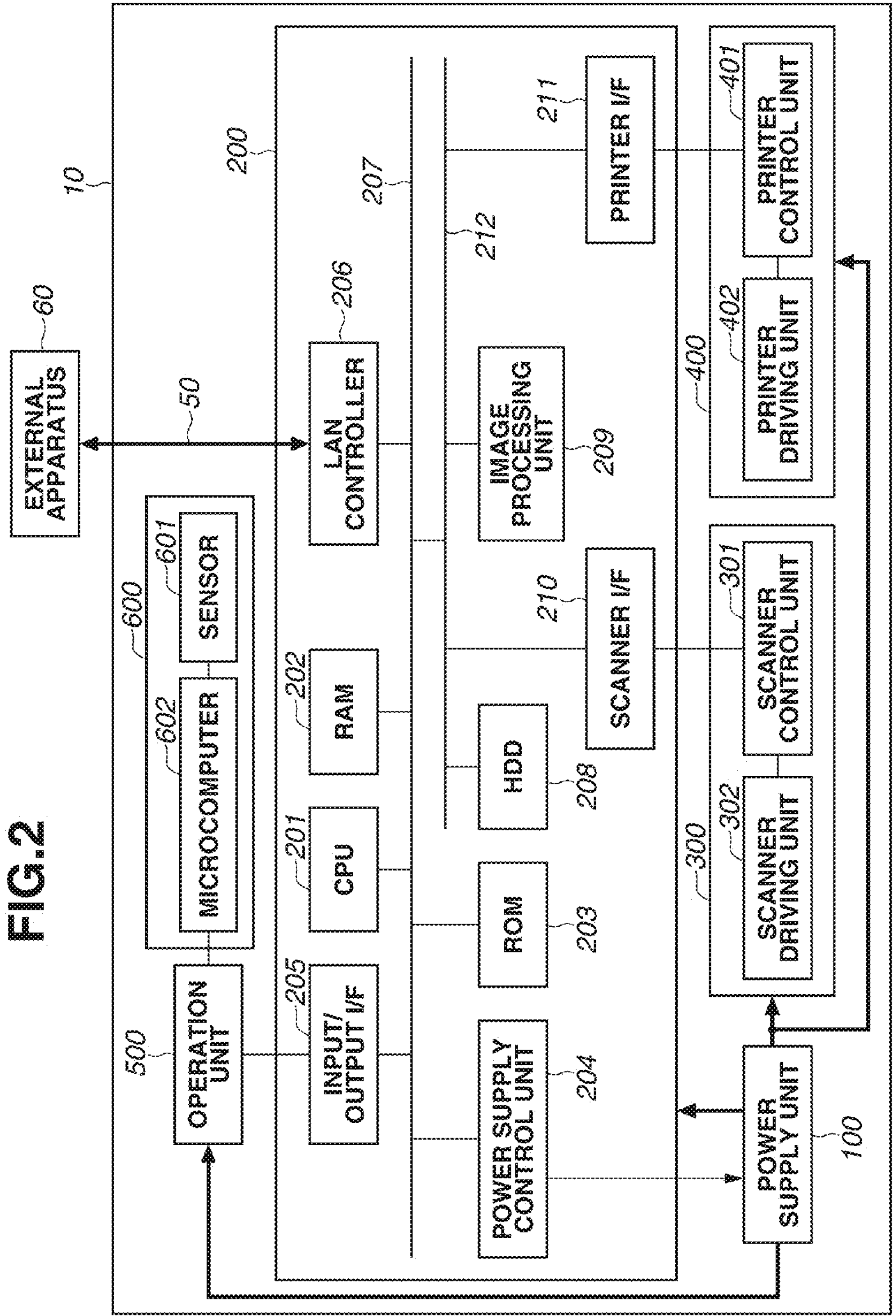
FIG. 2 is a block diagram of the image forming apparatus.

FIG. 2 is a block diagram of the image forming apparatus 10. The image forming apparatus 10 includes a controller 200 comprehensively controlling an operation of the image forming apparatus 10, a power supply unit 100, a scanner unit 300, a printer unit 400, an operation unit 500, and a sensor unit 600. The controller 200 governs an operation of the image forming apparatus 10. The controller 200 can communicate with the operation unit 500, the scanner unit 300, and the printer unit 400.

The controller 200 includes a central processing unit (CPU) 201, a random access memory (RAM) 202, a read-only memory (ROM) 203, a power supply control unit 204, an input/output interface (I/F) 205, and a local area network (LAN) controller 206. Such devices are connected to a system bus 207. The controller 200 further includes a hard disk drive (HDD) 208, an image processing unit 209, a scanner I/F 210, and a printer I/F 211. Such devices are connected to an image bus 212.

The CPU 201 controls the devices connected with the CPU 201 via the system bus 207 based on a control program stored in the ROM 203. The RAM 202 is a system work memory of the CPU 201. The RAM 202 temporarily stores image data. The ROM 203 stores a boot program of the image forming apparatus 10 and the like.

The power supply control unit 204 controls power supply to various units of the image forming apparatus 10. The power supply control unit 204 controls the power supply to various units of the image forming apparatus 10 based on instructions from the CPU 201, an interrupt from the operation unit 500, and an interrupt from the LAN controller 206. The power supply control unit 204 monitors a state of the power switch 30. If the power switch 30 is turned off by a user's operation, the power supply control unit 204 notifies the CPU 201 that the power switch 30 is turned off. The CPU 201, when notified that the power switch is turned off, performs shutdown processing for closing files, terminating applications, and terminating an operating system (OS). The CPU 201 then instructs the power supply control unit 204 to stop power supply. When the instruction to stop power supply is received, the power supply control unit 204 controls the power supply unit 100 to stop the power supply to various units of the image forming apparatus 10.

The input/output I/F 205 is an interface that transmits image data to be displayed on a display unit of the operation unit 500 to the operation unit 500 or notifies the CPU 201 of various keys of the operation unit 500 which are pressed. The LAN controller 206 transmits and receives information to/from an external apparatus 60 which is connected to a network 50. The HDD 208 stores system software and image data.

The image processing unit 209 is configured to perform image processing. The image processing unit 209 reads image data stored in the RAM 202, and performs image processing such as enlargement and reduction of an image and color adjustment. The scanner I/F 210 is an interface for communicating with a scanner control unit 301 of the scanner unit 300. The printer I/F 211 is an interface for communicating with a printer control unit 401 of the printer unit 400. The image bus 212 is a transmission path for exchanging image data. The image bus 212 includes, for example, a Peripheral Component Interface (PCI) bus or an Institute of Electrical and Electronics Engineers (IEEE) 1394 bus.

The operation unit 500 includes a touch panel for providing a user interface, keys for selecting the number of copies to be printed, and a start key for starting printing or scanning.

The image forming apparatus 10 may include an interface for exchanging data with a user's portable terminal. The interface includes, for example, a near field communication (NFC) reader writer and a Bluetooth (registered trademark) module.

The scanner unit 300 optically reads an image from a document and generates image data. The scanner unit 300 includes the scanner control unit 301 and a scanner driving unit 302. The scanner driving unit 302 includes a driving unit for moving a read head which reads a document, and a driving unit for conveying a document to a reading position. The scanner control unit 301 controls an operation of the scanner driving unit 302. The scanner control unit 301, when performing scanner processing, receives setting information set by the user through communication with the CPU 201 and controls the operation of the scanner driving unit 302 based on the setting information.

The printer unit 400 forms an image on a recording medium (sheet) according to an electrophotographic method. The printer unit 400 includes the printer control unit 401 and a printer driving unit 402. The printer driving unit 402 includes a motor for rotating a not-illustrated photosensitive drum, a mechanism unit for pressing a fixing unit, and a heater. The printer control unit 401 controls an operation of the printer driving unit 402. The printer control unit 401, when print processing is performed, receives setting information set by the user through communication with the CPU 201 and controls the operation of the printer driving unit 402 based on the setting information.

The sensor unit 600 includes an infrared array sensor (hereinafter, referred to as a sensor, if needed) 601 and a microcomputer 602. The sensor unit 600 is supplied with power even when the image forming apparatus 10 is in a power saving state. In the power saving state, the power supply to the microcomputer 602 may be stopped if needed. When the power supply to the microcomputer 602 is stopped, the microcomputer 602 needs to be supplied with power if the sensor 601 detects a predetermined temperature (for example, if a temperature at or above a predetermined degree is detected). The power supply to the sensor unit 600 may be stopped in a normal power state.

The microcomputer 602 is, for example, a one-chip microcomputer. The microcomputer 602 includes a not-illustrated processor, ROM, and RAM. The processor reads a program stored in the ROM for operation. In the present exemplary embodiment, the microcomputer 602 is arranged in the sensor unit 600 as an example. However, the microcomputer 602 of the sensor unit 600 may be substituted by a microcomputer arranged in the operation unit 500.

The microcomputer 602 performs each step of a flowchart of FIG. 7 described below to process a detection result of the sensor 601 and determine whether a user of the image forming apparatus 10 is present. If the microcomputer 602 determines that a user of the image forming apparatus 10 is present, the microcomputer 602 shifts the image forming apparatus 10 from the power saving state to the normal power state. If the microcomputer 602 determines that the image forming apparatus 10 shifts from the power saving state to the normal power state, the microcomputer 602 notifies the power supply control unit 204 of a sleep recover instruction via the input/output I/F 205. When the sleep recover instruction is received, the power supply control unit 204 controls the power supply unit 100 to recover the image forming apparatus 10 from the power saving state to the normal power state.

Figure 3:
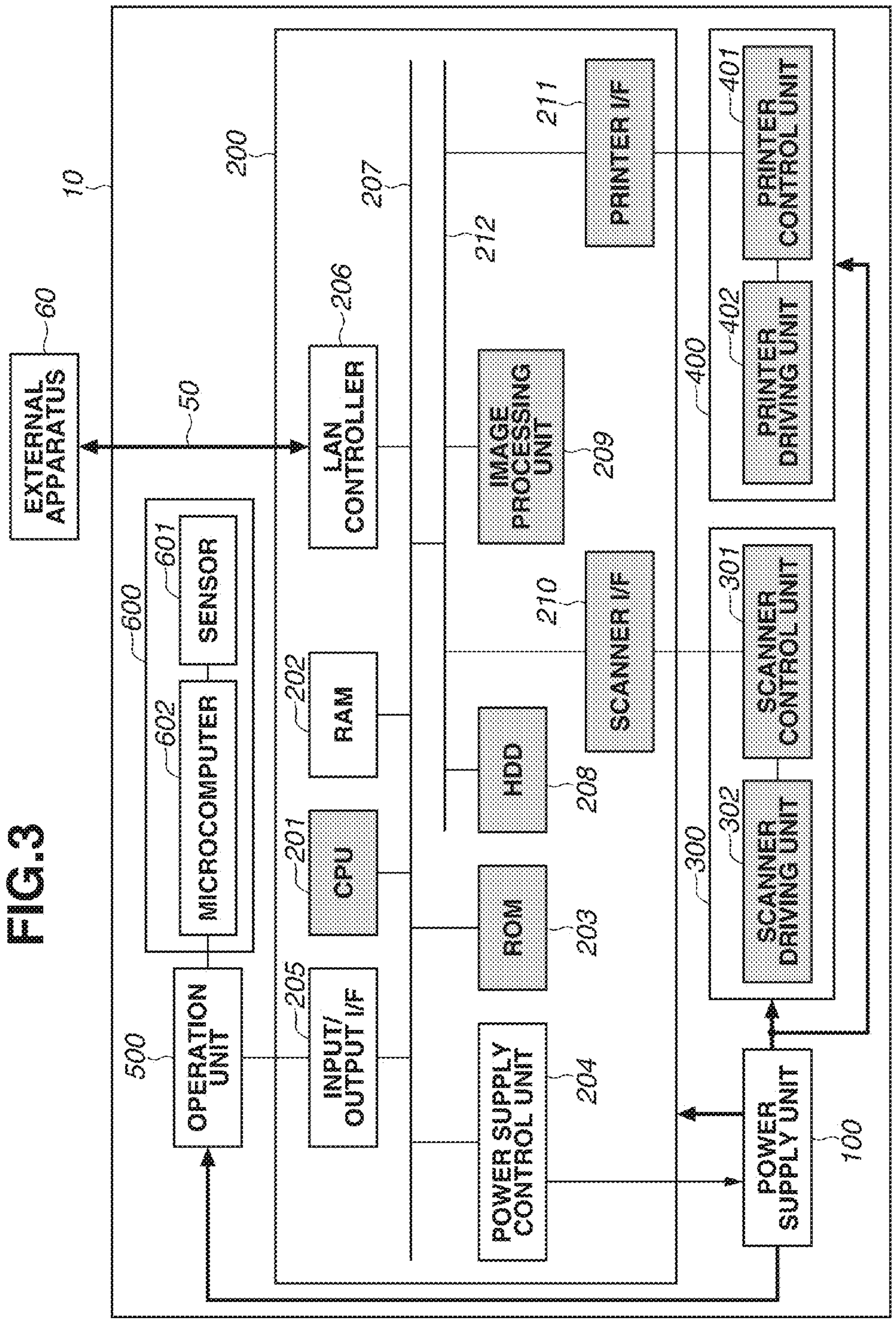
FIG. 3 is a diagram illustrating the image forming apparatus in a power saving state.

FIG. 3 illustrates the image forming apparatus 10 in the power saving state. In the power saving state, the power supply to the printer unit 400 and the scanner unit 300 of the image forming apparatus 10 is stopped to reduce power consumption during standby. If the image forming apparatus 10 is in the power saving state, while the RAM 202, the LAN controller 206, the power supply control unit 204, the sensor unit 600, the operation unit 500, and the input/output I/F 205 are supplied with power, the power supply to the other portions is stopped.

If a recovery factor is detected in the power saving state, the image forming apparatus 10 recovers from the power saving state to the normal power state. As an example of the recovery factor, the operation unit 500 is operated by a user, the microcomputer 602 of the sensor unit 600 determines that a user of the image forming apparatus 10 is present, or the LAN controller 206 receives data from the external apparatus 60.

In the normal power state, the power supply unit 100 supplies power to the units of the image forming apparatus 10. In the normal power state, various functions of the image forming apparatus 10, such as the copy function, can be performed. If the operation unit 500 is not operated for a certain time and a job is not received from the external apparatus 60, the image forming apparatus 10 shifts from the normal power state to the power saving state.

Figure 4:
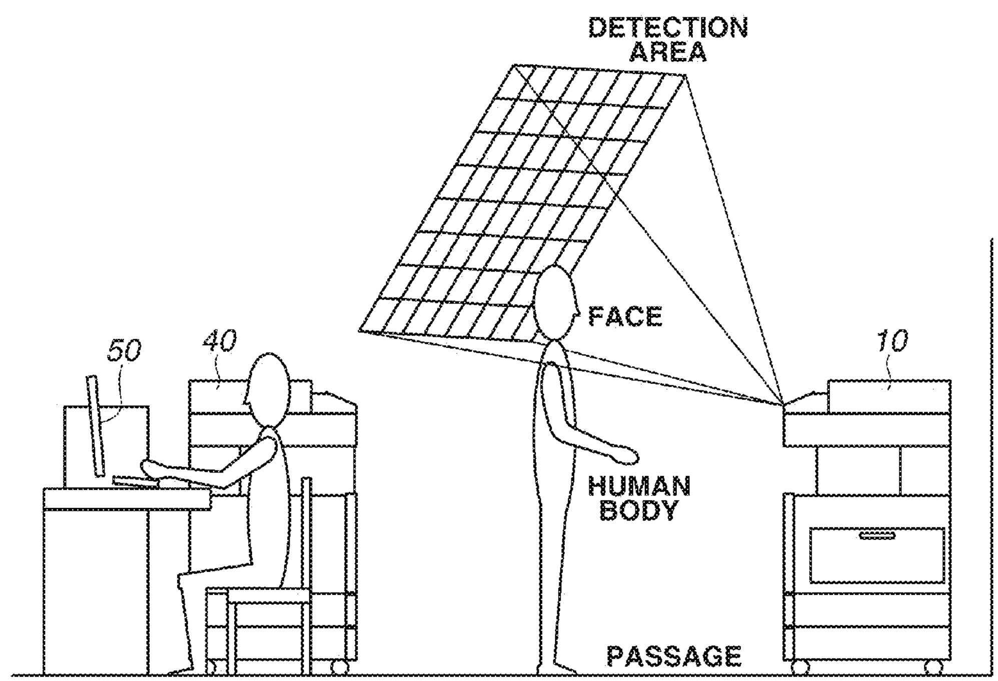
FIG. 4 is a diagram illustrating a detection area of an infrared array sensor.

FIG. 4 is a diagram illustrating a detection area of the infrared array sensor 601.

The infrared array sensor 601 according to the present exemplary embodiment is a sensor including a plurality of elements for receiving infrared rays. In the present exemplary embodiment, the plurality of elements is arranged in an M×N (for example, 8×8) grid-like pattern. M and N are natural numbers. M and N may have the same value. Each element of the infrared array sensor 601 receives infrared rays radiated from a heat source (object), and outputs temperature data on the heat source based on the intensity of the received infrared rays. The microcomputer 602 obtains the temperature data from the elements of the infrared array sensor 601. The set of pieces of temperature data obtained from the elements of the infrared array sensor 601 will be referred to as temperature distribution data. The microcomputer 602 uses the temperature distribution data obtained from the sensor 601 to determine whether a user who uses the image forming apparatus 10 is present.

The higher the ratio of heat (signal) radiated from a human to heat (noise) radiated from the surrounding environment (signal-to-noise (S/N) ratio), the higher the accuracy of human detection by the microcomputer 602. The S/N ratio when a human (with a body temperature of approximately 35° C.) is detected in a low temperature environment (for example, approximately 9° C. to 12° C.) is higher than that when a human (with a body temperature of approximately 35° C.) is detected in a high temperature environment (for example, approximately 29° C. to 32° C.). The accuracy of human detection is thus higher when a human is detected in a low temperature environment.

However, the image forming apparatus 10 is not necessarily placed in a low temperature environment. The image forming apparatus 10 can be placed in a high temperature environment depending on the country of installation, season, and room heating. The image forming apparatus 10 thus needs to accurately find out human position in various temperature environments.

In the present exemplary embodiment, the sensor 601 is arranged to detect the temperature of a "face" which is less susceptible to the temperature of the surrounding environment. There are also human body regions other than the face that are less susceptible to the temperature of the surrounding environment. However, the "face" is the best suited because the face is a region where skin is exposed and that is free of influence of clothing. To detect the temperature of the "face," the sensor 601 is arranged with its detection area oriented obliquely upward in front of the image forming apparatus 10.

Since the sensor 601 is oriented with the detection area obliquely upward in front of the image forming apparatus 10, another image forming apparatus 40 placed on the floor, a personal computer (PC) 50 on the desk, and a person sitting on the chair fall outside the detection area. This can prevent the image forming apparatus 10 from recovering erroneously from the power saving state due to the other image forming apparatus 40, the PC 50 on the desk, or the person sitting on the chair.

The microcomputer 602 obtains the temperatures of the elements of the infrared array sensor 601 at predetermined time intervals. The microcomputer 602 is supplied with power even when the image forming apparatus 10 is in the power saving state. The microcomputer 602 may be powered only during periods when the microcomputer 602 obtains the temperatures of the elements of the sensor 601. An element of the sensor 601 may be configured to output an interrupt signal to the microcomputer 602 if the element detects a temperature at or above a predetermined temperature. In such a configuration, the microcomputer 602 is energized only when the interrupt signal is input. This can reduce the power consumption of the microcomputer 602.

FIGS. 5A to 5C are diagrams illustrating temperature distribution data obtained from the infrared array sensor 601 and distributions of heat sources.

FIG. 5A illustrates a distribution of heat sources in a low temperature environment (approximately 9° C. to 12° C.). FIG. 5B illustrates a distribution of heat sources in a room temperature environment (approximately 20° C. to 23° C.). FIG. 5C illustrates a distribution of heat sources in a high temperature environment (approximately 29° C. to 32° C.). FIGS. 5A, 5B, and 5C illustrate the same situations where a person is standing in front of the image forming apparatus 10.

The infrared array sensor 601 illustrated in FIGS. 5A to 5C is a sensor including 64 infrared reception elements arranged in an 8×8 grid-like pattern. In the following description, the positions of the infrared reception element of the infrared array sensor 601 will be represented as an element (x coordinate, y coordinate).

The upper section of FIG. 5A illustrates current temperature distribution data obtained from the sensor 601. The middle section of FIG. 5A illustrates past temperature distribution data (hereinafter, referred to as background temperature data) obtained from the sensor 601. The background temperature data is data obtained when no person is standing in front of the image forming apparatus 10. The background temperature data represents the environment around the image forming apparatus 10. For example, the microcomputer 602 uses as the background temperature data the temperature distribution data obtained from the sensor 601 when the image forming apparatus 10 shifts to the power saving state. The background temperature data is stored in the RAM included in the microcomputer 602.

The microcomputer 602 determines, pixel by pixel, whether the current temperature distribution data is 1° C. or more higher than the background temperature data. The microcomputer 602 recognizes pixels of which the current temperature distribution data is 1° C. or more higher than the background temperature data, as heat source pixels. The lower section of FIG. 5A illustrates a detection result of heat source pixels detected by the microcomputer 602. In the present exemplary embodiment, a threshold of 1° C. is used. However, the threshold may be other than 1° C. The threshold may be dynamically changed according to the location and the surrounding environment where the image forming apparatus 10 is placed.

In the low temperature environment, the microcomputer 602 recognizes elements (1,1) to (8,1), (1,2) to (8,2), (2,3) to (7,3), (2,4) to (7,4), (2,5) to (7,5), (3,6) to (6,6), (4,7), and (5,7) as heat source pixels.

In the room temperature environment illustrated in FIG. 5B, the S/N ratio is lower than in FIG. 5A. The microcomputer 602 no longer recognizes elements (1,1) (8,1), (1,2), (8,2), (2,4), (7,4), (2,5), (7,5), (3,6), and (6,6) as heat source pixels.

In the high temperature environment, as illustrated in FIG. 5C, the S/N ratio is yet lower than in FIG. 5B. The microcomputer 602 recognizes only elements (6,5), (5,6), (4,7), and (5,7) as heat source pixels.

FIG. 6 is a chart illustrating analysis results of the microcomputer 602.

The microcomputer 602 calculates position information about each heat source pixel, and an area, height, and width of a heat source region based on the detection results of the heat source pixels illustrated in the lower sections of FIGS. 5A to 5C.

The analysis result in the low temperature environment illustrated in FIG. 5A shows the highest S/N ratio in FIGS. 5A to 5C. Therefore, with the analysis result in the low temperature environment as an expected value, the analysis result in the room temperature environment and the analysis result in the high temperature environment will be compared.

The analysis result in the low temperature environment will initially be described. In the low temperature environment, the number of pixels identified as a heat source region A is 40. The heat source region refers to a region where heat source pixels exist not discretely but together. In the low temperature environment, the heat source region A has a height of "7." The heat source region A has a width of "8." The coordinate of a center of gravity (hereinafter, referred to as gravity center coordinate) in a y-axis direction of the heat source region A is "3.35." The gravity center coordinate in an x-axis direction is "4.5."

In the low temperature environment, the maximum (MAX) coordinate in the y-axis direction of the heat source region A is "7" which comes from element (4,7) or element (5,7). The MAX coordinate in the x-axis direction is "8" which comes from element (8,1) or element (8,2). The minimum (MIN) coordinate in the y-axis direction of the heat source region A is "1" which comes from element (1,1) to element (8,1). The MIN coordinate in the x-axis direction is "1" which comes from element (1,1) or element (1,2).

In the low temperature environment, the coordinate of a center point (hereinafter, referred to as center coordinate) in the y-axis direction of the heat source region A is "4" which is calculated by ((the MAX coordinate in the y-axis direction: 7)+(the MIN coordinate in the y-axis direction: 1))/2. The center coordinate in the x-axis direction of the heat source region A is "4.5" which is calculated by ((the MAX coordinate in the x-axis direction: 8)+(the MIN coordinate in the x-axis direction: 1))/2.

Next, the analysis result in the room temperature environment will be described. In the room temperature environment, the number of pixels identified as a heat source region B is 30. The heat source region B has a height of "7." The heat source region B has a width of "7." The gravity center coordinate in the y-axis direction of the heat source region B is "3.27." The gravity center coordinate in the x-axis direction is "4.5."

In the room temperature environment, the MAX coordinate in the y-axis direction of the heat source region B is "7" which comes from element (4,7) or element (5,7). The MAX coordinate in the x-axis direction is "7" which comes from element (7,1), element (7,2), or element (7,3). The MIN coordinate in the y-axis direction of the heat source region B is "1" which comes from element (2,1) to element (7,1). The MIN coordinate in the x-axis direction is "2" which comes from element (2,1), element (2,2), or element (2,3).

In the room temperature environment, the center coordinate in the y-axis direction of the heat source region B is "4" which is calculated by ((the MAX coordinate in the y-axis direction: 7)+(the MIN coordinate in the y-axis direction: 1))/2. The center coordinate in the x-axis direction of the heat source region B is "4.5" which is calculated by ((the MAX coordinate in the x-axis direction: 7)+(the MIN coordinate in the x-axis direction: 2))/2.

The analysis result in the high temperature environment will be described. In the high temperature environment, the number of pixels identified as a heat source region C is 4. The heat source region C has a height of "3." The heat source region C has a width of "3." The gravity center coordinate in the y-axis direction of the heat source region C is "6.25." The gravity center coordinate in the x-axis direction is "5."

In the high temperature environment, the MAX coordinate in the y-axis direction of the heat source region C is "7" which comes from element (4,7) or element (5,7). The MAX coordinate in the x-axis direction is "6" which comes from element (6,5). The MIN coordinate in the y-axis direction of the heat source region C is "5" which comes from element (6,5). The MIN coordinate in the x-axis direction is "4" which comes from element (4,7).

The center coordinate in the y-axis direction of the heat source region C is "6" which is calculated by ((the MAX coordinate in the y-axis direction: 7)+(the MIN coordinate in the y-axis direction: 5))/2. The center coordinate in the x-axis direction of the heat source region C is "5" which is calculated by ((the MAX coordinate in the x-axis direction: 6)+(the MIN coordinate in the x-axis direction: 4))/2.

In the present exemplary embodiment, to accurately find out the position of a human face, the infrared array sensor 601 is arranged to face above the horizontal direction. Positional characteristic of the "face" in the human body is that the face is positioned the highest in the human body in the y-axis direction, and the face is positioned in the center of the human body in the x-axis direction. In terms of the analysis results illustrated in FIG. 6, the characteristic of the "face" in the y-axis direction is represented by the "MAX coordinate in the y-axis direction." The characteristic of the "face" in the x-axis direction is represented by the "gravity center coordinate in the x-axis direction" or the "center coordinate in the x-axis direction." Then, in the present exemplary embodiment, coordinates including the "MAX coordinate in the y-axis direction" and the "gravity center coordinate in the x-axis direction" or the "center coordinate in the x-axis direction" are assumed to be a feature point of the heat source region.

As illustrated by the "difference from the expected value" in FIG. 6, it can be seen that the "MAX coordinate in the y-axis direction," the "gravity center coordinate in the x-axis direction," and the "center coordinate in the x-axis direction" have not much difference from (A) the analysis result in the low temperature environment. In particular, the "MAX coordinate in the y-axis direction," the "gravity center coordinate in the x-axis direction," and the "center coordinate in the x-axis direction" of (B) the analysis result in the room temperature environment have zero "difference from the expected value" of (A) the analysis result in the low temperature environment.

In other words, it can be seen that the "MAX coordinate in the y-axis direction," the "gravity center coordinate in the x-axis direction," and the "center coordinate in the x-axis direction" stably indicate the position of the face in various temperature environments.

In the present exemplary embodiment, coordinates including the "MAX coordinate in the y-axis direction" and the "gravity center coordinate in the X-axis direction" are used to determine whether the heat source detected by the infrared array sensor 601 is a user of the image forming apparatus 10. The "center coordinate in the x-axis direction" may be used instead of the "gravity center coordinate in the x-axis direction." While the present exemplary embodiment uses the coordinates including the "MAX coordinate in the y-axis direction" and the "gravity center coordinate in the x-axis direction," feature amounts other than the "MAX coordinate in the y-axis direction" and the "gravity center coordinate in the x-axis direction" may be used as long as the feature amounts represent a positional characteristic of the "face" and have not much difference from the expected value in different environments.

Figure 7:
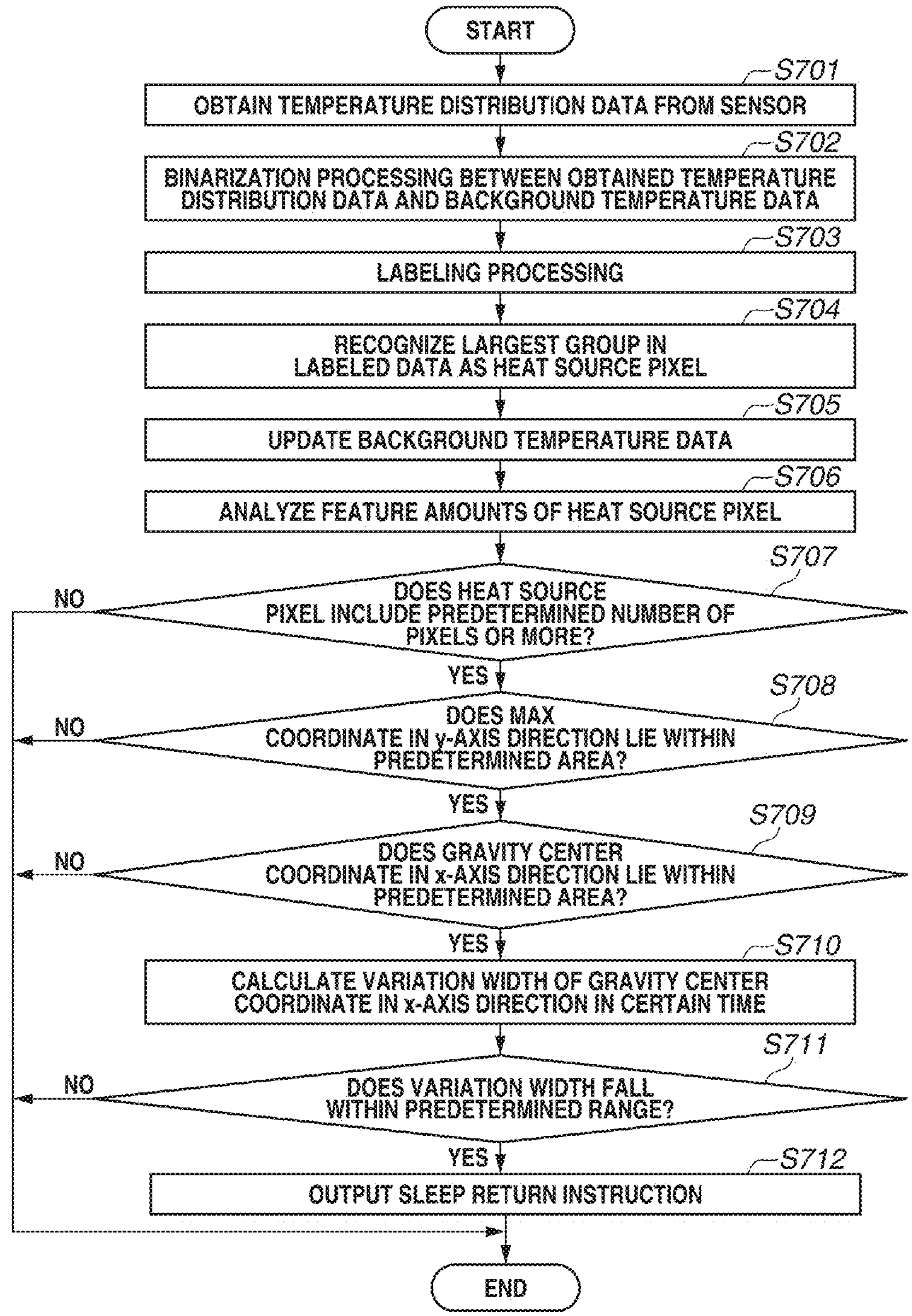
FIG. 7 is a flowchart illustrating a user detection processing.

FIG. 7 illustrates a user detection processing flow performed by the microcomputer 602.

The user detection processing of FIG. 7 is executed each time (each frame) the microcomputer 602 obtains new data from the sensor 601. The execution timing is not necessarily limited to one frame. For example, the microcomputer 602 may execute the user detection processing once in ten frames. During the remaining nine frames, the microcomputer 602 may enter a power saving state to reduce power consumption. The processing of this flowchart can be implemented by the processor in the microcomputer 602 reading and executing a program stored in the ROM.

In step S701, the microcomputer 602 obtains temperature distribution data from the pixels of the sensor 601. In step S702, the microcomputer 602 subtracts background temperature data already stored in the RAM in the microcomputer 602 from the obtained temperature distribution data. The microcomputer 602 then extracts differences greater than or equal to a predetermined value (1° C.) from differences between the temperature distribution data and the background temperature data (binarization processing).

In step S703, the microcomputer 602 performs labeling processing. The labeling processing is processing for extracting a largest heat source region and eliminating other groups of smaller heat source regions if there is a plurality of discrete heat source pixels as a result of the binarization processing. The heat source region extracted by the labeling processing is a target of subsequent processing for analyzing feature amounts. While the largest heat source region is taken as the target of the analysis of feature amounts, a heat source region having a highest average temperature may be taken as the target of the analysis of feature amounts. The labeling processing can prevent small heat sources, such as a lighting fixture on the ceiling, from becoming the target of the analysis of feature amounts.

In step S705, the microcomputer 602 updates the background temperature data, which is compared with temperature distribution data obtained in the next frame, and stores the background temperature data into the RAM in the microcomputer 602. The background temperature data is updated by adding the background temperature data already stored in the microcomputer 602 and the temperature distribution data obtained in the current frame together in predetermined proportions.

In step S706, the microcomputer 602 analyzes feature amounts of the heat source region extracted in step S703. The microcomputer 602 obtains the "MAX coordinate in the y-axis direction" and the "gravity center coordinate in the x-axis direction" as a feature point of the heat source region. The feature point is stored in the RAM in the microcomputer 602 and will be referred to by the microcomputer 602 in subsequent frames.

Based on the coordinates of the feature point stored by the foregoing processing, the microcomputer 602 determines whether the heat source region corresponds to a user who uses the image forming apparatus 10 or a passerby who passes in front of the image forming apparatus 10. A specific description is given below.

In step S707, the microcomputer 602 determines whether the heat source region includes a predetermined number of pixels or more. If the heat source region is determined to include a predetermined number of pixels or more (YES in step S707), then in steps S708 and S709, the microcomputer 602 determines whether the "MAX coordinate in the y-axis direction" and the "gravity center coordinate in the x-axis direction" lie in a predetermined area (referred to as a recovery area). In the present exemplary embodiment, the recovery area ranges from the fifth to eighth rows in the y-axis direction. While the recovery area according to the present exemplary embodiment is a rectangular area, the recovery area may have a downward convex shape or a trapezoidal shape.

If the heat source region includes only a single pixel, heat from a lighting fixture or the influence of outside air temperature may be mistaken for the heat source. If the heat source region includes a plurality of pixels, the heat source is likely to be a larger one, i.e., a human-based one. In the present exemplary embodiment, the microcomputer 602 therefore determines in step S707 whether the heat source region includes more than one pixel.

If the "MAX coordinate in the y-axis direction" and the "gravity center coordinate in the x-axis direction" lie in the predetermined area (YES in step S708 and YES in step S709), then in step S710, the microcomputer 602 calculates a variation width of the "gravity center coordinate in the x-axis direction" in a certain time (hereinafter, referred to as monitoring time). For example, if the gravity center coordinate in the x-axis direction moves from 1 to 8 in 0.5 seconds, the variation width is 7. The variation width represents the width of lateral movement of the user with respect to the front of the image forming apparatus 10. If the width of movement is small, the person is standing in front of the image forming apparatus 10, not passing in front of the image forming apparatus 10.

In step S711, the microcomputer 602 determines whether the variation width falls within a predetermined range (for example, the variation width is smaller than or equal to a threshold of 1). If the variation width falls within the predetermined range (YES in step S711), then in step S712, the microcomputer 602 outputs a sleep recover instruction to the power supply control unit 204 of the controller 200.

In the exemplary embodiment described above, when it is determined that the "MAX coordinate in the y-axis direction" and the "gravity center coordinate in the x-axis direction" have entered the recovery area, the approach of a person to the image forming apparatus 10 is determined.

In the exemplary embodiment described above, it can be determined that the person is approaching the image forming apparatus 10 since the variation width of the "gravity center coordinate in the x-axis direction" is small.

If the power supply control unit 204 receives the sleep recover instruction, the power supply control unit 204 controls the power supply unit 100 to cause the power state of the image forming apparatus 10 to recover from the power saving state to the normal power state. The parameters of the foregoing predetermined range can be arbitrarily set by an administrator or a user of the image forming apparatus 10. The parameters may be dynamically changed for each user logging in the image forming apparatus 10.

The present exemplary embodiment has described an example where the image forming apparatus 10 recovers from the power saving state to the normal power state. However, the state to which the image forming apparatus 10 recovers from the power saving state may be other than the normal power state as long as the power consumption is higher than in the power saving state. For example, the state to which the image forming apparatus 10 recovers from the power saving state may be another power saving state with higher power consumption than in the power saving state.

FIG. 8 illustrates a case where a user directly approaches the image forming apparatus 10 from in front of the image forming apparatus 10. The upper section of FIG. 8 illustrates positional relationships between the image forming apparatus 10 and the human body. The middle section of FIG. 8 illustrates detection results of heat source pixels in the respective positional relationships. The lower section of FIG. 8 illustrates feature amounts calculated by the microcomputer 602.

In the example of FIG. 8, a heat source region is the target for analyzing feature amounts if the heat source region includes two or more pixels. The recovery area is above the dotted lines in the middle section of FIG. 8, ranging from the fifth to eight rows in the y-axis direction. The monitoring time of the variation width of the gravity center position in the x-axis direction is 0.5 seconds. The predetermined range is 1.

At time T1, the person enters the detection area of the sensor 601. As illustrated by the detection result of heat source pixels, the pixels detected as heat source pixels by the microcomputer 602 are elements (4,1), (5,1), (4,2), and (5,2). Elements in the lower portion (lower side) of the sensor 601 are detected as the heat source pixels. If a heat source is detected in the detection area, the microcomputer 602 displays a screen on a liquid crystal display (LCD) in the operation unit 500. The microcomputer 602 may turn on or blink a not-illustrated light-emitting diode (LED) to notify the user that the image forming apparatus 10 detects the user.

At time T2, the person approaches the image forming apparatus 10. The heat source region detected by the microcomputer 602 expands to the first to fourth rows in the y-axis direction and laterally to the third to sixth columns in the x-axis direction.

At time T3, the human body reaches the recovery area of the image forming apparatus 10. If the human body reaches the recovery area, the microcomputer 602 calculates the variation width of the "gravity center coordinate in the x-axis direction" in the last 0.5 seconds before T3. Since the "gravity center position in the x-axis direction" remains unchanged at 4.5 from time T1 to time T3, the microcomputer 602 calculate the variation width to be 0. The microcomputer 602 therefore outputs the sleep recover instruction.

As described above, if the user directly approaches the image forming apparatus 10, the image forming apparatus 10 can recover from the power saving state at the same time as the user reaches the recovery area.

Figure 9:
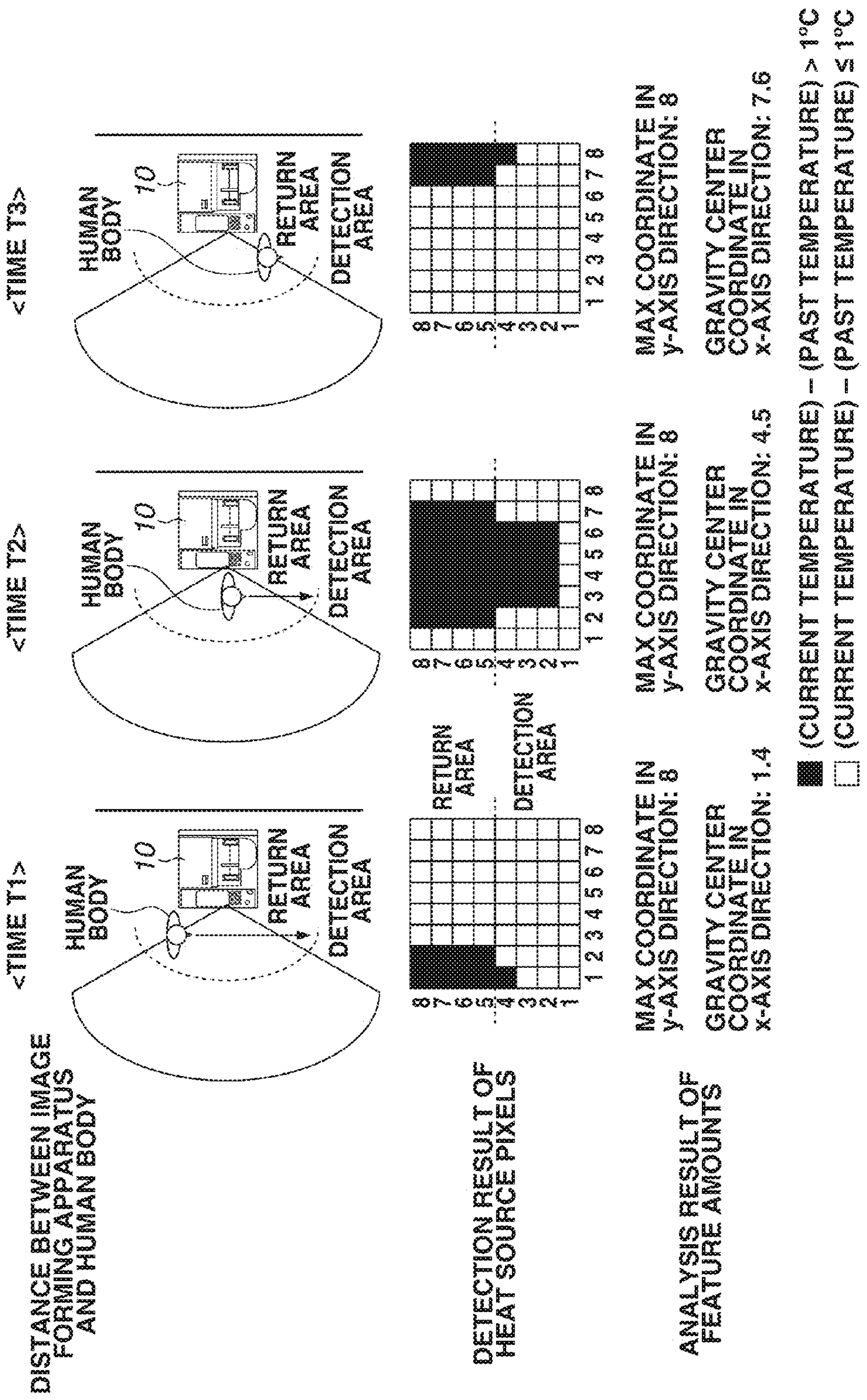
FIG. 9 is a diagram illustrating a case where a user cut across a front of the image forming apparatus.

FIG. 9 illustrates an example where the user passes near the image forming apparatus 10. The upper section of FIG. 9 illustrates positional relationships between the image forming apparatus 10 and the human body. The middle section of FIG. 9 illustrates the detection results of heat source pixels in the respective positional relationships. The lower section of FIG. 9 illustrates the feature amounts calculated by the microcomputer 602.

In the example of FIG. 9, a heat source region becomes the target for analyzing feature amounts if the heat source region includes two or more pixels. The recovery area is above the dotted lines in the middle section of FIG. 9, ranging from the fifth to eight rows in the y-axis direction. The monitoring time of the variation width of the gravity center position in the x-axis direction is 0.5 seconds. The predetermined range is 1.

At time T1, the microcomputer 602 detects elements (1,4) to (1,8) and elements (2,5) to (2,8) on an end side in the x-axis direction of the sensor 601 as heat source pixels.

At time T2, the human body is moving in front of the image forming apparatus 10. The microcomputer 602 calculates the variation width of the "gravitation center coordinate in the x-axis direction" in the last 0.5 seconds before time T2. If the interval between times T1 and T2 is 0.5 seconds, the microcomputer 602 here calculates the variation width to be 3.1. Since the variation width of 3.1 is greater than the predetermined range of 1, the microcomputer 602 does not output the sleep recovery instruction at this point in time.

At time T3, the human body is moving away from the image forming apparatus 10. In such a scene if the interval between times T2 and T3 is 0.5 seconds, the microcomputer 602 calculates the variation width to be 3.1. Since the variation width of 3.1 is greater than the predetermined range of 1, the microcomputer 602 does not output the sleep recover instruction at this point in time.

Thus, the microcomputer 602 can prevent erroneous recovery of the image forming apparatus 10 even if the user passes near the image forming apparatus 10. In the example of FIG. 9, if the person stops in front of the image forming apparatus 10, the variation width becomes smaller than the predetermined range of 1 and the microcomputer 602 outputs the sleep recover instruction.

According to the present exemplary embodiment, the position of a human face can be calculated from the temperature distribution data obtained by the sensor 601. Based on the position, the position of the person can be accurately found out in various temperature environments.

Other Exemplary Embodiments

The foregoing exemplary embodiment of the present invention is applied to an MFP. However, an exemplary embodiment of the present invention may be applied to various apparatuses such as an air conditioner, an air purifier, a television set, a recording apparatus, a PC, an automobile, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-138898, filed Jul. 10, 2015, which is hereby incorporated by reference herein in its entirety.

What is claimed is:

1. An image forming apparatus having a sensor including a plurality of elements and each of the plurality of elements outputs temperature data, the image forming apparatus comprising:

one or more processors; and memory, wherein one or more programs are stored in the memory and configured to be executed by the one or more processors, the one or more programs including:

instruction for identifying elements that output temperature data which is higher than a reference temperature among the plurality of elements;

instruction for identifying a heat source region where the number of elements is largest from among a plurality of heat source regions formed by the identified elements;

instruction for determining one or more feature parameters of the identified largest heat source region; and instruction for shifting a power state of the image forming apparatus based on the one or more the determined feature parameters.

2. The image forming apparatus according to claim 1, wherein the one or more programs further including:

instruction for storing temperature data output from the plurality of elements in a memory as the reference temperature.

3. The image forming apparatus according to claim 1, wherein the instruction for identifying the elements is based on a difference between temperature data output from the each of the plurality of elements and the reference temperature data.

4. The image forming apparatus according to claim 1, wherein the one or more feature parameters includes an uppermost y coordinate in a y-axis direction of the largest heat source region.

5. The image forming apparatus according to claim 4, wherein the instruction for shifting the power state of the image forming apparatus is based on at least the y coordinate.

6. The image forming apparatus according to claim 1, wherein the feature parameter includes an x coordinate of a center of gravity or a middle point in an x-axis direction of the largest heat source region.

7. The image forming apparatus according to claim 6, wherein the instruction for shifting the power state of the image forming apparatus is based on that a moving width of the x coordinate is within a predetermined area during a predetermined period.

8. The image forming apparatus according to claim 1, wherein the feature parameter includes an uppermost y coordinate in a y-axis direction of the largest heat source region and an x coordinate of a center of gravity or a middle point in an x-axis direction of the largest heat source region.

9. The image forming apparatus according to claim 8, wherein the instruction for shifting the power state of the image forming apparatus is based on the y coordinate and the x coordinate.

10. The image forming apparatus according to claim 1, wherein each of the plurality of elements are receive infrared rays.

11. The image forming apparatus according to claim 1, wherein the plurality of elements are arranged in a grid-like pattern.

12. A method for controlling an image forming apparatus including a sensor including a plurality of elements and each of the plurality of elements outputs temperature data, the method comprising:

identifying elements that output temperature data which is higher than a reference temperature among the plurality of elements;

identifying a heat source region where the number of elements is largest from among a plurality of heat source regions formed by the identified elements;

determining one or more feature parameters of the identified largest heat source region; and shifting a power state of the image forming apparatus based on the one or more the determined feature parameters.

13. The method for controlling the image forming apparatus according to claim 12, further comprising storing temperature data from the plurality of elements as the reference temperature.

14. The method for controlling the image forming apparatus according to claim 12, wherein the identifying the element is based on a difference between temperature data from the each of the plurality of elements and the reference temperature data.

15. The method for controlling the image forming apparatus according to claim 12, wherein the one or more feature parameters includes an uppermost y coordinate in a y-axis direction of the largest heat source region.

16. The method for controlling the image forming apparatus according to claim 14, wherein the shifting the power state of the image forming apparatus is based on at least the y coordinate.

17. The method for controlling the image forming apparatus according to claim 12, wherein the feature parameter includes an x coordinate of a center of gravity or a middle point in an x-axis direction of the largest heat source region.

18. The method for controlling the image forming apparatus according to claim 17, wherein the shifting the power state of the image forming apparatus is based on that a moving width of the x coordinate is within a predetermined area during a predetermined period.

19. The method for controlling the image forming apparatus according to claim 12, wherein calculating the feature parameter includes an uppermost y coordinate in a y-axis direction of the largest heat source region and an x coordinate of a center of gravity or a middle point in an x-axis direction of the largest heat source region.

20. The method for controlling the image forming apparatus according to claim 19, wherein the shifting the power state of the image forming apparatus is based on the y coordinate and the x coordinate.

21. The method for controlling the image forming apparatus according to claim 12, wherein each of the plurality of elements are receive infrared rays.

22. The method for controlling the image forming apparatus according to claim 12, wherein the plurality of elements are arranged in a grid-like pattern.

23. The image forming apparatus according to claim 1, further comprising: a printer unit that prints an image on a medium.

24. The image forming apparatus according to claim 1, further comprising: a scanner unit that scans an image on an original.

25. The method for controlling the image forming apparatus according to claim 12, further comprising: printing an image on a medium.

26. The method for controlling the image forming apparatus according to claim 12, further comprising: scanning an image on an original.

* * * * *